United States Patent Office 3,445,271
Patented May 20, 1969

3,445,271
SIMULTANEOUS VAPOR PLATING OF
PLURAL SUBSTANCES
Arne Jensen, Havnbjerg, Als, Denmark, assignor to Danfoss A/S, Nordborg, Denmark, a company of Denmark
Filed Jan. 18, 1966, Ser. No. 521,253
Claims priority, application Germany, Jan. 26, 1965,
D 46,355
Int. Cl. C23c 13/02
U.S. Cl. 117—106    5 Claims

ABSTRACT OF THE DISCLOSURE

A method for vapor plating as a homogeneous mixture a plurality of substances each having a different vaporization temperature onto a base surface. Layers of substances to be plated are disposed on a carrying surface and heat is applied to only part of the layers to vaporize the layers consecutively and simultaneously establishing relative motion between the carrying surface and the heat source. The part of the layers being vaporized continuously changes position and this part is juxtapositioned to the base surface so that the substances are deposited on the base surface as a homogeneous mixture.

---

This invention relates to a method and apparatus for vapor plating as a homogeneous mixture a plurality of substances, each having a different vaporization temperature, onto a base surface, the base surface being the surface of an article to be plated.

In many technical fields coatings are produced by vapor plating. The coatings, for example, may be for purposes of chemical and/or mechanical protection, on optical glass for the improvement of certain optical properties, or for the production of solid state electronic components. In certain instances, such as in the case of the production of solid state electronic components, the base surface on which the coating is plated is of secondary importance, whereas the coating itself is of primary importance.

Sometimes it is desired to vapor plate a base surface with two or more substances with the desired coatings being in the form of a homogeneous mixture of the substances. Generally, different substances will have different vaporization temperatures. The term "vaporization temperature" denotes the temperature at which the vapor pressure of the substance equals the ambient pressure.

Great difficulty and generally lack of success has been characteristic of previous attempts to vapor plate as a homogeneous mixture a plurality of substances each having a different vaporization temperature onto a base surface. Thus, for example, when the substances are placed as a mixture in a crucible which is heated, distillation occurs, i.e., the contents of the crucible remain at the vaporization temperature of the substance having the lowest vaporization temperature until that substance has been completely vaporized and thus vapor plated, and this occurs sequentially for each of the substances, the substances being vaporized in chronological order corresponding to their vaporization temperatures. In this manner what is formed on the base surface is not a coating constituted of a homogeneous mixture of the substances but rather is a plurality of coatings, each of a different one of the substances.

One attempt to overcome this problem has been to place each of the substances in a different individually heated crucible. However, it is found to be exceedingly difficult to precisely control the relative heating of a plurality of crucibles to obtain a homogeneous coating having exactly the same composition throughout its depth.

Another prior method involves forming each substance into pellets or bullets which are alternately introduced into a heated crucible in the proportions of the desired mixture. However, this method is exceedingly slow. Furthermore, rather than plating a single homogeneous coating as is desired, there is obtained a plurality of coatings corresponding in number and in composition to the individual pellets, the coatings being disposed on top of one another. It might be attempted to cause adjoining coatings to diffuse into one another by means of a heat treatment. However, any diffusion so achieved is rather minor and the coating remains essentially a plurality of coatings and, in any event, is far from homogeneous.

According to the invention there is provided a method for successfully vapor plating as a homogeneous mixture a plurality of substances, each having a different vaporization temperature, onto a base surface. The method comprises placing each substance as an individual layer on a carrying surface, the bottom most layer being on the carrying surface itself and each subsequent layer being disposed one on top of the other, and transmitting from a heat source to only a part of said layers heat sufficient to elevate the temperatures of the substances to their vaporization temperatures while, simultaneously with this transmitting of heat, establishing relative motion between the carrying surface and the heat source. The expression "part of the layers" means an adjoining part of each of the layers. Due to the above referred to relative motion the part of the layers to which is transmitted heat sufficient to elevate the temperatures of the substances to their vaporization temperatures continuously changes position. By supporting the base surface which it is desired to coat in juxtaposition to the vaporization temperature heated part of the layers, a coating constituting a homogeneous mixture of the substances is vapor plated onto the base surface, as all the substances constitute the part of the layers which is heated to the vaporization temperatures of the substances and therefore all the substances simultaneously vaporize from this part of the layers. The vaporized substances deposit as a homogeneous mixture on the base surface. The expression "base surface" of course denotes any single surface or plurality of surfaces of any single article or plurality of articles which it is desired to coat by the vapor plating.

Apparatus which may be used to carry out the method of the invention comprises means defining a carrying surface for the superposed layers of the substances, a heat source less than coextensive with the carrying surface and juxtaposed to the means defining the carrying surface to heat a part of the superposed layers on the carrying surface to the vaporization temperatures of the substances, means for establishing relative motion between the carrying surface and the heat source and means for supporting the base surface in juxtaposition to the part of the superposed layers heated to the vaporization temperatures.

The operation of the invention causes a range of temperatures extending laterally across the layers in the direction of relative motion. The range of temperatures include the vaporization temperature of each of the substances and there are individual portions where the vaporization temperature of each of the substances prevails and accordingly at these respective portions each of these substances vaporizes, all of which occurs simultaneously.

In order to avoid the disruption of the layers, it is preferred to arrange the layers in ascending order in inverse relation to the magnitudes of their vaporization temperatures. In other words, the layer beneath any given layer is of a substance having a higher vaporization temperature than the substance of the given layer.

The most efficient operation is generally achieved by providing a rate and extent of heat transmission from the heat source and a relative speed between the carrying surface and the seat source which together result in the complete vaporization of the layers in a single pass of the heat source relative to the carrying surface.

It is frequently found desirable to establish relative motion between the base surface and the carrying surface as well as relative motion between the carrying surface and the heat source. In this manner, rather large base surfaces can be vapor plated. Furthermore, in this manner, any influence which the distance between the portions of the layers from which the various substances are vaporizing may have in decreasing the homogeneity of the ultimate coating is minimized.

Should it be found in any instance that there is some undesired heterogeneity, this can be remedied by heating the coating to a temperature sufficient to cause diffusion of the substances into one another. This is in contrast with the prior method of using pellets referred to above in which method heating is not particularly efficient in causing diffusion as the different substances are superposed on one another as distinct layers which, furthermore, frequently are of considerable thickness. In the present invention in any instance in which a heat treatment is needed diffusion occurs efficiently as any heterogeneity is essentially lateral rather than depthwise. In the present invention generally heat treatment will not be necessary unless the substances differ very greatly in vaporization temperatures.

The invention will now be further described in detail by reference to the drawings in which.

Figure 1:
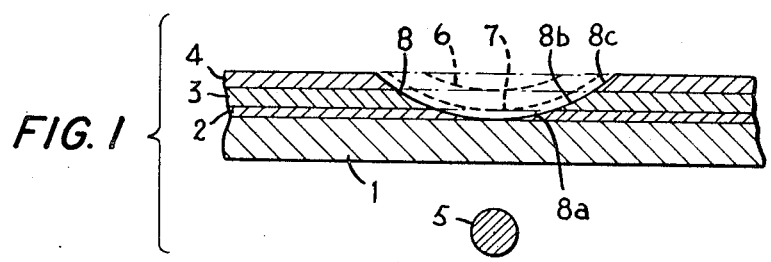
FIG. 1 is a schematic cross section of the carrying element having layers of the various substances on it and of the heat source, at the beginning of operation.

On a carrying element 1 defining a carrying surface is disposed one on top of the other three layers 2, 3 and 4, each of a different substance having a different vaporization temperature. For example, these layers may have been consecutively vapor plated onto the carrying element 1. The thickness of these layers varies in accordance with the desired proportions of the substances in the ultimate coating. If for example it were desired to produce a semi-conductor element free of blocking layers, consisting of a homogeneous mixture of tellurium, arsenic and silicon, the silicon, which has the lowest vapor pressure, would be layer 2, the tellurium, which has a somewhat higher vapor pressure would be layer 3, and the arsenic, which has the highest vapor pressure, would be layer 4. Below the carrying element 1 is disposed a heat source 5.

When the heat source 5 is activated, the carrying element 1 and the layers 2 to 4, which lie above, are heated. Since the vaporization temperature of the substance of layer 4 is lowest this temperature will be first attained. Accordingly, the substance of layer 4 will vaporize until layer 4 has retreated far enough from the heat source 5 no longer to be heated to its vaporization temperature thereby. At this time the heat energy from the heat source 5 will cease to be consumed in vaporizing the substance of layer 4. The heat energy from the heat source 5 will now elevate the temperatures of the layers 2 and 3 until the vaporization temperature of the substance of the layer 3 is attained. Then, similarly to what happened to layer 4, the substance of layer 3 will vaporize until layer 3 has retreated to a point sufficiently removed from the heat source 5 so that it is no longer heated to its vaporization temperature thereby. The heat energy emanating from the heat source 5 will now elevate the temperature of the layer 2 to the vaporization temperature of its substance, which in turn will vaporize until the layer 2 has retreated to a point sufficiently removed from the heat source 5 so that the heat source 5 no longer heats its substance to the vaporization temperature. Thus, the part of the layers which is heated to the vaporization temperatures of the respective substances is defined by the vaporization surface 8. The vaporization surface 8 is the surface from which the substances are vaporizing simultaneously after the initial start-up, hereinabove described. At the end of the first start-up stage, during which first stage only the substance of layer 4 was vaporizing, an intermediate vaporization surface 6 exists. Similarly, at the end of the second stage of the start-up, during which stage only the substance of layer 3 was vaporizing, an intermediate vaporization surface 7 exists.

Figure 2:
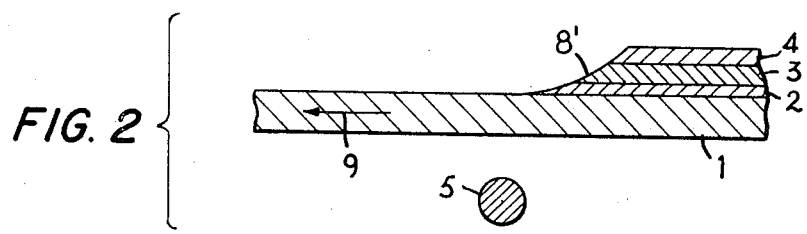
FIG. 2 is of the same arrangement as in FIG. 1 but during operation.

When the final stage illustrated in FIG. 1 is attained, i.e., when the vaporization surface 8 is defined, the start-up is finished and the carrying element 1 is moved at a predetermined speed in the direction of the arrow 9 past the heat source 5 (FIG. 2). The speed is selected so that the vaporization surface 8 continuously retreats. Simultaneously, from the portion of the vaporization surface 8 defined by the layer 2, which portion remains at the vaporization temperature of the substance of layer 2, the substance of the layer 2 vaporizes and the same thing occurs with respect to the layers 3 and 4. Thus, onto a base surface supported above the vaporization surface 8 the three substances are simultaneously deposited as a homogeneous coating. The vaporization surface 8 may be referred to as the part of the layers which is heated to the vaporization temperatures of the substances.

Figure 3:
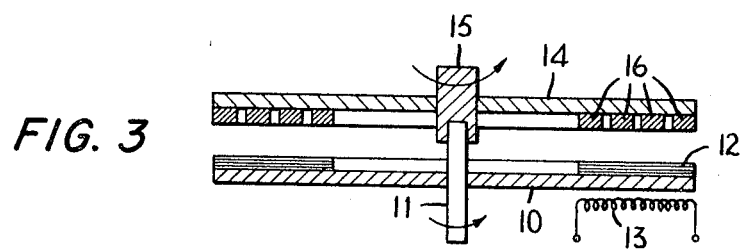
FIG. 3 is a schematic cross section of a detailed embodiment of the invention.

In a particularly convenient and efficient embodiment, the carrying element is a plate 10 which is mounted on a shaft 11 essentially perpendicular to the shaft 11 for rotation about the axis thereof (FIG. 3). On an annular area of the plate 10 are carried superposed layers 12 of the substances. The heater 13, arranged on the other side of the plate 10 extends in a line radial of the annular area and is essentially coextensive with the radial dimension of the annular area.

A second plate 14 is mounted on its own drive shaft 15 for rotation about the common axis of the shafts 11 and 15. The articles 16, the exposed surfaces of which constitute the base surface which is to be coated, are supported on an annular area of the plate 16 essentially co-extensive with the annular area of the plate 10 on which the layers 12 are disposed.

The shafts 11 and 15 are individually rotationally driven to carry with them respectively the plates 10 and 14 in the direction indicated by the rotational arrows. Preferably, the rotational speed of the plate 10 and the thermal output of the heat source 13 are selected so that the layers 12 are completely vaporized in a single revolution of the plate 10. This single revolution can be employed to deposit a rather thick homogeneous layer of the substances upon the exposed surfaces of the articles 16.

The foregoing is certainly not the only embodiment within the scope of the invention. Thus, for example, rather than the plates 10 and 14 there may be used a pair of continuous or "endless" belts mounted facing each other for lengthwise movement. A face of one of the belts carries the layers of the substances and an opposed face of the other of the belts carries the article or articles to be vapor plated. The heating element extends in a line transverse to the direction of movement to the belts, preferably essentially perpendicular thereto, and in a plane preferably parallel to the planes of the opposing faces of the belts.

Furthermore, the invention is not to be construed as limited to the particular forms disclosed herein, since these are to be regarded as illustrative rather than restrictive. Thus, for example, the heating means may not be an electrical resistance heater as illustrated in FIG. 3 but may be any heat source. Furthermore, it is not necessary to place the heat source below the carrying means, but on the contrary it can be placed above the carrying means to influence the layers from above. Also, the article or articles to be coated may be stationarily supported rather than supported for motion.

What I claim and desire to secure by Letters Patent is:

1. A method for vapor plating as a homogeneous mixture a plurality of substances, each have a different vaporization temperature, onto a base surface, said method comprising placing said substances as layers on a carrying surface with each of said substances constituting a layer on top of a layer of another of said substances, transmitting from a heat source to only a part of said layers heat sufficient to elevate the temperatures of the substances to their vaporization temperatures and, simultaneously with said transmitting of heat, establishing relative motion between the carrying surface and the heat source, whereby the part of said layers to which is transmitted heat sufficient to elevate the temperatures of the substances to their vaporization temperatures continuously changes position, and supporting said base surface in juxtaposition to said part of said layers, whereby said substances simultaneously vaporize from said part of said layers and are deposited on said base surface as a homogeneous mixture.

2. A method according to claim 1, further comprising establishing relative motion between said base surface and said carrying surface.

3. A method according to claim 2, wherein said relative motion between said base surface and said carrying surface is at a greater speed than the speed of the relative motion between said carrying surface and said heat source.

4. A method according to claim 1, wherein said layers are arranged on top of one another on said carrying surface in ascending order to inverse relation to the magnitudes of their vaporization temperatures.

5. A method according to claim 1, wherein the rate and extent of heat transmision from the heat source and the relative speed between the carrying surface and the heat source, together, result in the complete vaporization of said layers in a single pass of the heat source relative to the carrying surface.

References Cited

UNITED STATES PATENTS

| | | | |
|---|---|---|---|
| 2,482,329 | 9/1949 | Dimmick | 118—49 |
| 2,898,241 | 8/1959 | Charlton et al. | 117—107.1 X |
| 2,968,583 | 1/1961 | Barth | 117—107.1 X |
| 3,128,205 | 4/1964 | Illsley | 118—49 |
| 3,171,017 | 2/1965 | Siddall et al. | 118—49.5 X |

ALFRED L. LEAVITT, *Primary Examiner.*

A. GOLIAN, *Assistant Examiner.*

U.S. Cl. X.R.

117—107.1